United States Patent
Finn et al.

(10) Patent No.: US 10,928,252 B2
(45) Date of Patent: Feb. 23, 2021

(54) COMPRESSIVE SENSING DETECTOR

(71) Applicant: Carrier Corporation, Palm Beach Gardens, FL (US)

(72) Inventors: Alan Matthew Finn, Hebron, CT (US); Joseph V. Mantese, Ellington, CT (US); Nicholas Charles Soldner, Southbury, CT (US); Vijaya Ramaraju Lakamraju, Avon, CT (US); Sameh Dardona, South Windsor, CT (US); Ziyou Xiong, Wethersfield, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 256 days.

(21) Appl. No.: 16/077,372

(22) PCT Filed: Feb. 6, 2017

(86) PCT No.: PCT/US2017/016652
§ 371 (c)(1),
(2) Date: Aug. 10, 2018

(87) PCT Pub. No.: WO2017/139216
PCT Pub. Date: Aug. 17, 2017

(65) Prior Publication Data
US 2019/0049307 A1    Feb. 14, 2019

Related U.S. Application Data

(60) Provisional application No. 62/293,810, filed on Feb. 11, 2016.

(51) Int. Cl.
*G01J 5/00* (2006.01)
*G01J 5/34* (2006.01)
*G01J 5/08* (2006.01)

(52) U.S. Cl.
CPC .......... *G01J 5/0025* (2013.01); *G01J 5/0806* (2013.01); *G01J 5/0831* (2013.01); *G01J 5/34* (2013.01)

(58) Field of Classification Search
CPC ...... G01J 5/0025; G01J 5/0806; G01J 5/0831; G01J 5/34
See application file for complete search history.

(56) References Cited

U.S. PATENT DOCUMENTS 5,606,165 A   2/1997 Chiou et al.
7,351,975 B2   4/2008 Brady et al.
(Continued)

FOREIGN PATENT DOCUMENTS

CN   101738381 A   6/2010
DE   102014209039 A1   11/2014
EP   2757775 A2   7/2014

OTHER PUBLICATIONS

"A Coded Aperture Compressive Imaging Array and Its Visual Detection and Tracking Algorithms for Surveillance Systems", Chen et al., Sensors 2012, 12, pp. 14397-14415; doi: 10.3390/s 121114397, Open Access Sensors ISSN 1424-8220, pp. 19.
(Continued)

*Primary Examiner* — David P Porta
*Assistant Examiner* — Fani Boosalis
(74) *Attorney, Agent, or Firm* — Cantor Colburn LLP

(57) ABSTRACT

A detector includes a sensor configured to sense a moving object in at least one of the electromagnetic spectrum and the acoustic spectrum. A fixed coded aperture of the detector is disposed between a moving object and the sensor.

14 Claims, 3 Drawing Sheets

(56) References Cited

U.S. PATENT DOCUMENTS

| | | |
|---|---|---|
| 8,017,899 B2 | 9/2011 | Levenets et al. |
| 8,035,085 B2 | 10/2011 | Slinger |
| 9,336,445 B2 * | 5/2016 | Das .................... G06K 9/00771 |
| 2008/0074252 A1 | 3/2008 | Micko |
| 2009/0095912 A1 | 4/2009 | Slinger et al. |
| 2011/0062335 A1 | 3/2011 | Franklin |
| 2013/0011051 A1 | 1/2013 | Bottisti et al. |
| 2014/0348386 A1 | 11/2014 | Das |
| 2015/0253193 A1 | 9/2015 | Schilz et al. |

OTHER PUBLICATIONS

"Compressive Sensing Image Sensors—Hardware Implementation", Dadkhah et al., Sensors 2013, 13, pp. 4961-4978; doi: 10.3390/s 130404961, Open Access sensors, ISSN 1424-8220, pp. 18.

"Human-tracking systems usijg pyroelectric infrared detectors", Shankar et al., Optical Engineering 106401-1 vol. 45(10), Oct. 2006, 10 pgs.

"Lensless Imaging by Compressive Sensing", Huang et al., Bell Labs, Alcate-Lucent, Murray Hill, NJ 07974, 5 pgs.

"Passive millimeter-wave imaging with compressive sensing", Gopalsami et al., Optical Engineering vol. 51(9), 091614 (Sep. 2012), SPIEDigitalLibrary.org/oe, 10 pgs.

ISR/WO, dated May 22, 2017.

* cited by examiner

COMPRESSIVE SENSING DETECTOR

CROSS-REFERENCE TO RELATED APPLICATIONS

This application claims the benefit of PCT/US2017/016652 filed Feb. 6, 2017, which claims priority to U.S. Provisional Application No. 62/293,810 filed Feb. 11, 2016, which is incorporated herein by reference in its entirety.

BACKGROUND

The present disclosure relates to a compressive sensing detector, and more particularly, to a passive infrared coded aperture detector.

What may be a primary feature of many building management systems (e.g., security system) is the ability to detect intrusions such as the presence of a person or vehicle where none should be present. This is known to be achieved in a number of ways. For example, relative to indoor applications, it may be common to use a passive infrared (PIR) sensor. PIR sensors may be inexpensive, but unfortunately are susceptible to many false alarms or nuisance alarms. These alarms may be inherent to PIR detection technology and include alarms from pets, reflected sunlight, laser pointers, mirrors, drafts from heating, ventilation and air-conditioning (HVAC) systems, and others.

SUMMARY

A detector according to one, non-limiting, embodiment of the present disclosure includes a sensor configured to sense a moving object in at least one of the electromagnetic spectrum and the acoustic spectrum; and a fixed coded aperture disposed between a moving object and the sensor.

Additionally to the foregoing embodiment, the detector includes a digital signal processor configured to receive signals from the single sensor; and a sampler operatively disposed between the sensor and the digital signal processor, and configured to provide samples of a sensor output at a prescribed sample rate.

In the alternative or additionally thereto, in the foregoing embodiment, the detector is a single-pixel detector and the sensor is a single sensor.

In the alternative or additionally thereto, in the foregoing embodiment, the sensor is a pyroelectric sensor.

In the alternative or additionally thereto, in the foregoing embodiment, the digital signal processor is configured to solve a sparse inverse problem to detect the moving object.

In the alternative or additionally thereto, in the foregoing embodiment, the digital signal processor is configured to apply analytics for reducing false detections.

In the alternative or additionally thereto, in the foregoing embodiment, the detector includes a lens disposed between the pyroelectric sensor and the fixed coded aperture.

In the alternative or additionally thereto, in the foregoing embodiment, the detector includes a digital signal processor configured to receive signals from the sensor.

In the alternative or additionally thereto, in the foregoing embodiment, the digital signal processor is configured to solve a sparse inverse problem to detect the moving object.

In the alternative or additionally thereto, in the foregoing embodiment, the digital signal processor is configured to apply analytics for reducing false detections.

In the alternative or additionally thereto, in the foregoing embodiment, the detector includes a lens disposed between the pyroelectric sensor and the fixed coded aperture.

A security system for detecting a moving object in a predefined space according to another, non-limiting, embodiment includes a radiant energy sensor configured to monitor the space and measure energy radiating from the object in the space; a fixed coded aperture disposed between the object and the radiant energy sensor; and a digital signal processor configured to receive signals from the radiant energy sensor.

Additionally to the foregoing embodiment, the security system includes a sampler operatively disposed between the sensor and the digital signal processor, and configured to provide samples of a sensor output at a prescribed sample rate.

In the alternative or additionally thereto, in the foregoing embodiment, the digital signal processor is configured to solve a sparse inverse problem to detect the object.

In the alternative or additionally thereto, in the foregoing embodiment, the digital signal processor is configured to apply analytics for reducing false detections.

A method of operating a single pixel detector according to another, non-limiting, embodiment includes sensing a moving object within a field of view of a random mask array by a single sensor; sending a signal indicative of detection of the moving object from the sensor to a digital signal processor; and solving a sparse inverse problem by the digital signal processor to complete detection of the moving object.

Additionally to the foregoing embodiment, the single sensor is an infrared sensor.

In the alternative or additionally thereto, in the foregoing embodiment, the random mask array is a single mask.

In the alternative or additionally thereto, in the foregoing embodiment, the method includes applying analytics by the digital signal processor to reduce false detections.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
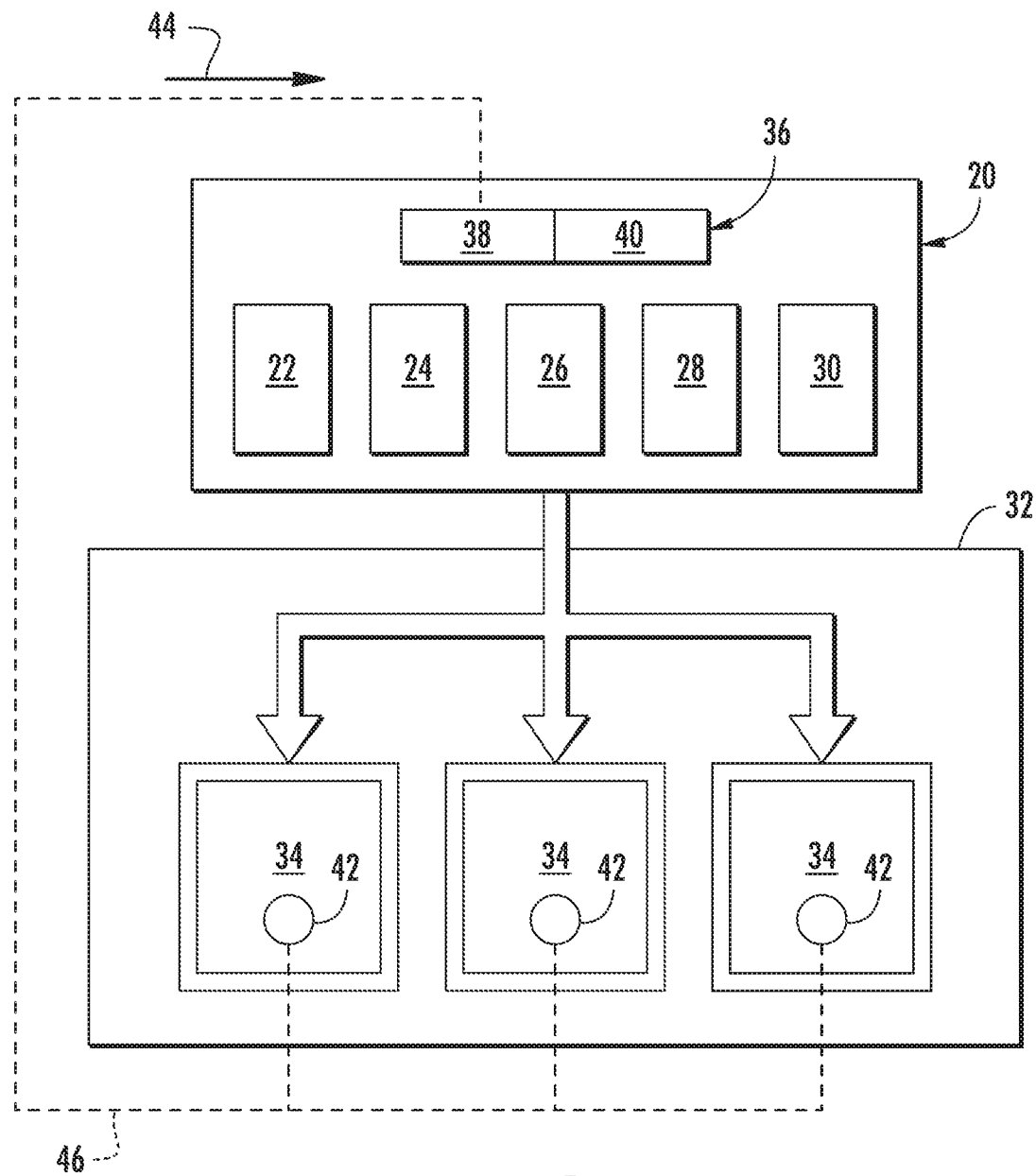
FIG. 1 is a schematic of a building management system utilizing a pyroelectric detector of the present disclosure.

Referring to FIG. 1, a building management system 20 of the present disclosure is illustrated. The building management system 20 may include at least one of an ambient air temperature control system 22, a security system 24 (i.e., intrusion system), a lighting or illumination system 26, a transportation system 28 a safety system 30 and others. Each system 22, 24, 26, 28, 30 may be associated with and/or contained within a building 32 having a plurality of pre-defined spaces 34 that may generally be detached or substantially isolated from one-another, may be accessible and/or interconnected via a door and/or through hallways (not shown) and other means.

The ambient air temperature control system 22 may be a forced air system such as a heating, ventilation, and air conditioning (HVAC) system, a radiant heat system and others. The security system 24 may be configured to detect intruders and provide various forms of alerts and notifications. The lighting system 26 may control and/or monitor lighting in each one of the predefined spaces 34 based on any number of factors including natural background lighting, occupancy and others. The transportation system 28 may include the control and/or monitoring of elevators, escalators, and other transportation devices associated with and/or within the building 32. The safety system 30 may include the detection of conditions that may pose a risk or health hazard to occupants of the building 32. All of these systems 22, 24, 26, 28, 30 may require a variety of devices to perform any variety of functions including detection, monitoring, communication, data referencing and collection, user control, and others. Many devices may be shared between systems.

The building management system 20 may further include a computing device 36 that controls and/or supports each system 22, 24, 26, 28, 30. The computing device 36 may include a processor 38 (e.g., microprocessor) and a computer readable and writeable storage medium 40. It is further contemplated and understood that the building management system 20 may include more than one computing device 36 with any one computing device being dedicated to any one of the systems 22, 24, 26, 28, 30.

The building management system 20 includes at least one pyroelectric detector 42 (i.e., a detector designated for a space 34). The detector 42 may be a low cost and low resolution, compressive sensing, pyroelectric detector capable of detecting moving objects (e.g., humans) in a pre-determined field of view of the detector 42 (i.e., a scene) that may generally cover the space 34. In one embodiment, the detector 42 may supplement functions of the building management system 20 (e.g., HVAC system 22, lighting system 26, security system 24 and others). For example, the computing device 36 may receive a signal (see arrow 44) over a wired or wireless pathway(s) 46 from the detector 42 indicative of a number of intruders in a given space 34. Upon such a signal 44, the computing device 36 may output a command signal (not shown) to the security system 24 for initiating a security response that may be an alert, an alarm, and/or other initiations.

Figure 2:
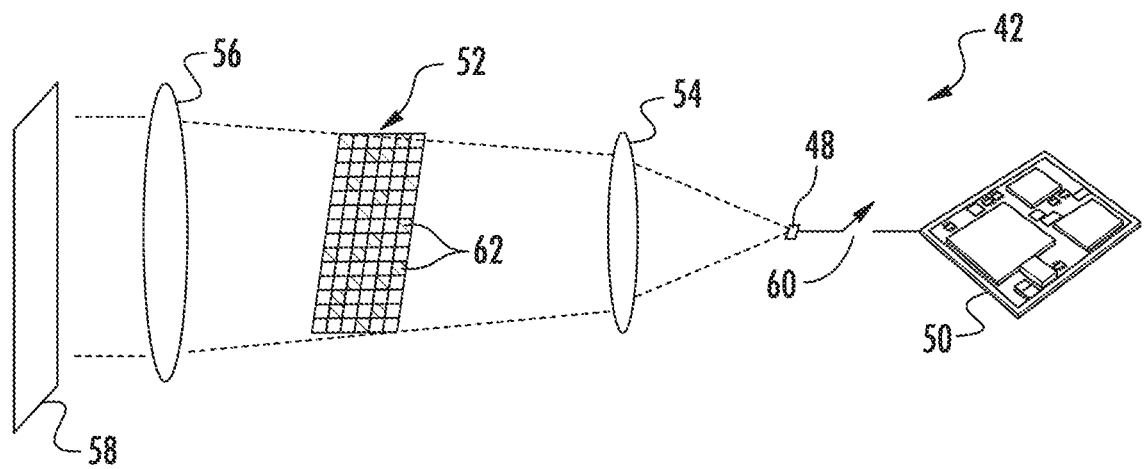
FIG. 2 is a schematic of the pyroelectric detector.

Referring to FIG. 2, the detector 42 may include a radiant energy sensor 48, a sampler 60 (i.e., a form of a switch), a computer-based processor 50 (e.g., a digital signal processor), and a coded aperture 52 (e.g., random mask array). The detector 42 may further include first and second lenses 54, 56. The first lens 54 may be disposed between the sensor 48 and the coded aperture 52, and is adapted to establish a field of view of the sensor 48 that may cover about all of a plurality of mask elements 62 of the coded aperture 52. The second lens 56 may be disposed between the coded aperture 52 and a scene 58 being monitored, and may be adapted to establish a field of view of the coded aperture 52 that may cover about all of the pre-designated scene.

The sensor 48 may be a radiant energy sensor, and may be a single, inexpensive, pixel that may be an infrared pixel. In an alternative embodiment, the radiant energy sensor 48 may be a small array, e.g., 4×4, of sensors where the sensors are not used in such a way as to produce an image. In yet another embodiment, the sensor(s) 48 may be configured to sense a moving object in at least one of an electromagnetic spectrum and an acoustic spectrum. Sampler 60 provides samples of the output of radiant energy sensor 48 at a sample rate. The sample rate may be periodic or aperiodic and preferably is a periodic rate faster than the fastest moving object transit time between adjacent mask elements 62 of coded aperture 52. The coded aperture 52 may be constructed as a fixed coded aperture, also referred to as a random binary mask. Coded aperture 52 may be comprised of an array of mask elements 62 that are, in whole or in part, transmissive and non-transmissive, in a spatially random, pseudo-random, or specifically designed pattern as will be subsequently discussed with respect to FIG. 3. Alternatively or additionally, the mask elements 62 of the coded aperture 52 may be, in whole or in part, sensitive to different portions of the electromagnetic or acoustic spectrum, and may themselves be in a random, pseudo-random, or specifically designed non-regular pattern. Detection by the detector 42 of moving objects may be achieved by an over-complete dictionary of potential targets (e.g., humans, animals, etc.) from multiple trajectories, and compressive sensing. Compressive sensing is implemented by the processor 50 to complete the detection. In an alternative embodiment a distinct computer-based processor 50 is not used and the output of sampler 60 is sent via pathway 46 to computing device 36 where the detection process is executed.

Figure 3:
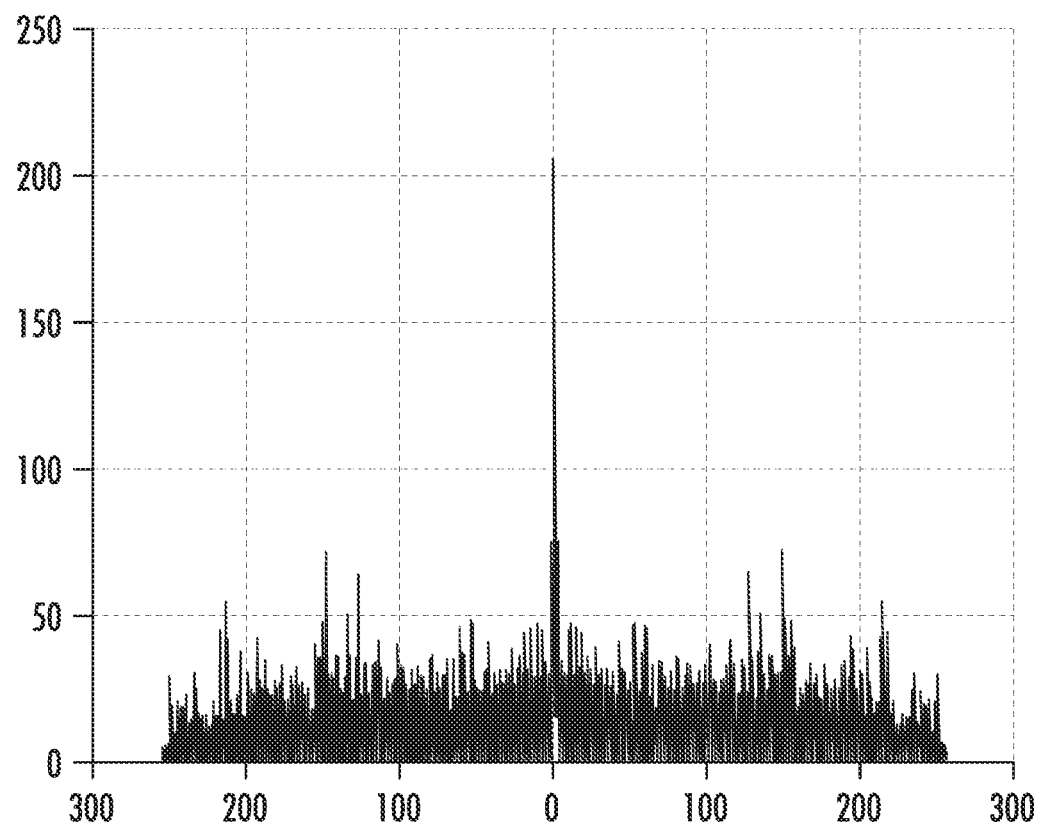
FIG. 3 is a graph of the cross-correlation of a sensor output for a plurality of random target tracks across a field of view using a random binary mask of the pyroelectric detector.

In operation, when a targeted object crosses the field of view (i.e., the scene 58) of the detector 42, and in space 34, a time series of observations may be generated from the sensor 48 and sampler 60 depending on the pattern of the coded aperture 52 (e.g., random mask array), the object motion (i.e., trajectory and velocity), and the object radiant energy emission (e.g., infrared emission). The time series observation for each object and associated motion may be unique, or nearly so, and may be subject to field of view edge effects. The desired result is when each possible target and track produce a time series that is uncorrelated with any other. Referring to FIG. 3, a plot of cross-correlation of the sensor 48 and sampler 60 output for a plurality of random object tracks across the field of view (i.e., scene 58) is illustrated. In this example, the plurality of random object tracks is about two-hundred and fifty-six (256) and the fixed coded aperture has an array size of about 64 by 64. FIG. 3 shows a two-dimensional projection (down the diagonal) of the three-dimensional cross-correlation matrix of the 256 target tracks. The cross-correlation of a track with itself (the diagonal) shows a large value where all other cross-correlations show much smaller values demonstrating the relative uniqueness of the tracks.

Figure 4:
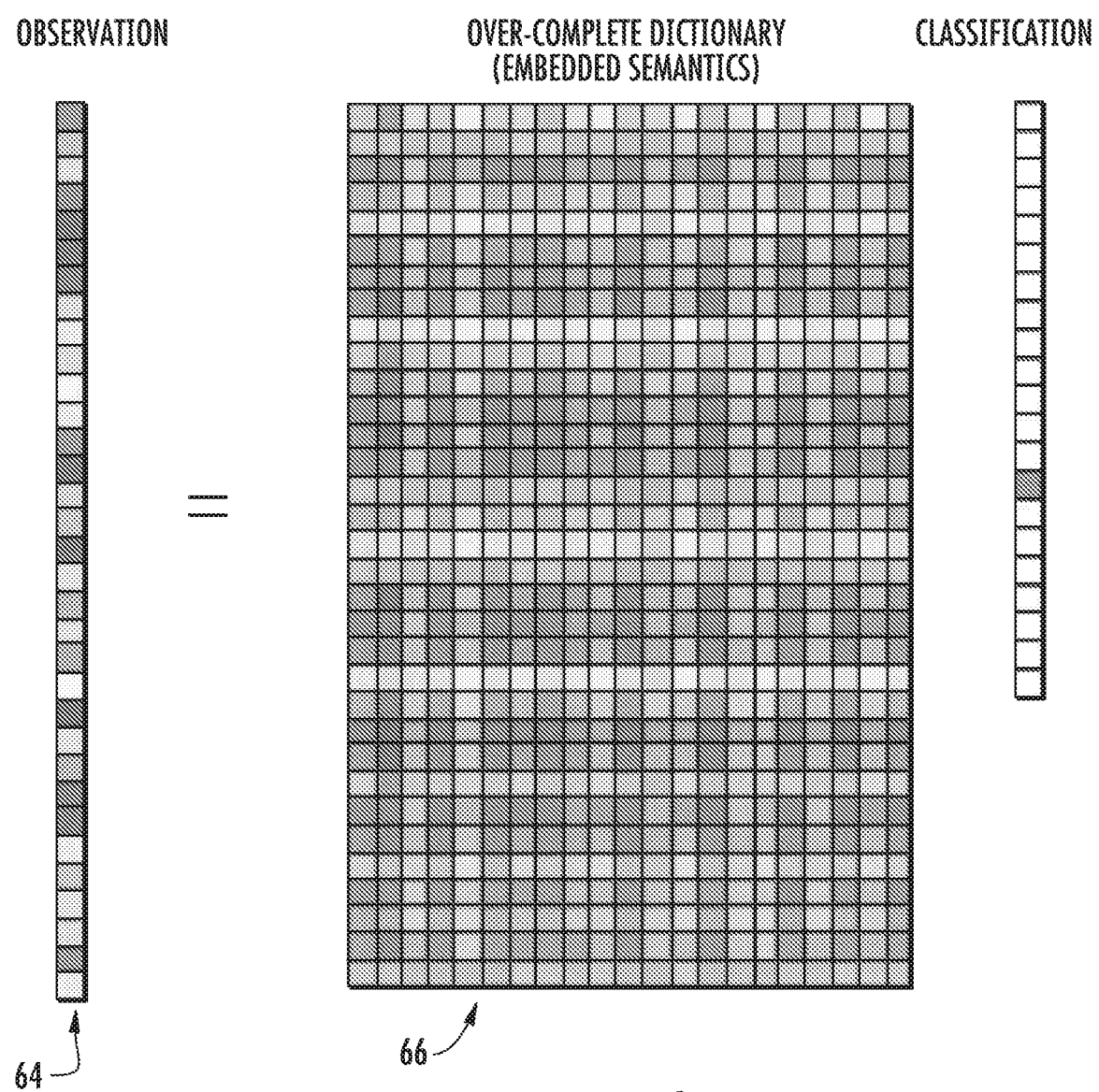
FIG. 4 depicts an over-complete dictionary utilized by the pyroelectric detector.

To produce a detection of the moving object, the processor 50 executes a mathematical approach to invert the time series of observations into a sparse representation (or other solution or suitable representation of the object for accurate detection). One example of the mathematical approach is to solve a sparse over-complete dictionary problem (see FIG. 4), where the time series observation is arranged as a vector 64. Solving an 'L1' regularized inverse problem will find the unique, best sparse model from the over-complete dictionary 66 (e.g., state, track, size) for the observed data where state may be, for example, position, velocity and/or acceleration. Here 'L1' denotes the norm that is the sum of the absolute value of the elements of a vector and is also sometimes known as the Manhattan norm. As is well known, solving an ill-posed inverse problem requires regularization to produce a unique solution. To produce a sparse solution would typically require regularization with the computationally infeasible 'L0' norm. The theory of compressed sensing has shown that the mathematically tractable 'L1' norm may be used for regularization under the appropriate circumstances. While this example is mathematically accurate, the creation of such an over-complete dictionary 66 may be infeasible for a particular application, if only for the memory requirements.

Another example of a mathematical approach, is to adaptively learn the dictionary 66, where the dictionary is constrained to only represent valid data models, represented mathematically by:

$$\min_{\substack{\alpha \in \mathcal{R}^{k \times n} \\ \Phi \in C}} \sum_{i=1}^{n} \frac{1}{2} \|x_i - \Phi \alpha_i\|_2^2 + \lambda \|\alpha_i\|_1$$

$$C = \{\Phi \in \mathcal{R}^{m \times k} : \forall j = 1, \ldots k, \|\phi_j\|_2 < 1\}$$

where "ϕ" is the dictionary, "x" is the observed data, and "α" is the sparse model identification vector. It is further understood that other mathematical approaches may apply.

Having mathematically computed a detection (or track) of a moving object in the field of view or scene 58, image, video, or other analytics, known to those having skill in the art, may be used to classify the object and respond appropriately (e.g., raise a security alarm for a person or vehicle, and not raising an alarm for a pet or other false alarm sources).

Benefits of the present disclosure include a detector 42 that does not require an expensive spatial light modulator nor does it need an expensive focal plane array sensor. Other advantages include a detector that achieves detection and tracking of moving objects through hardware and associated mathematics without the use of moving parts. Moreover, such detection may be used to reject false or nuisance alarms more typical of PIR intrusion detectors. The detector 42 of the present disclosure is low in cost and may generally amount to the cost of a PIR intrusion detector plus the cost of a DSP chip to compute a sparse constrained optimization problem. Although the present detector 42 may only detect moving objects, this may be a desirable attribute for intrusion detection.

While the present disclosure is described with reference to exemplary embodiments, it will be understood by those skilled in the art that various changes may be made and equivalents may be substituted without departing from the scope of the present disclosure. For example, it is understood that while explained in reference to a pyroelectric detector, any sensor of electromagnetic or acoustic energy is within the intended scope. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A detector comprising:
   a sensor configured to sense a moving object in at least one of the electromagnetic spectrum and the acoustic spectrum; and
   a fixed coded aperture disposed between a moving object and the sensor;
   a digital signal processor configured to receive signals from the single sensor, wherein the detector is a single-pixel detector and the sensor is a single pixel, the digital signal processor is configured to solve a sparse inverse problem to detect the moving object using an adaptively learning dictionary represented mathematically by:

$$\min_{\substack{\alpha \in \mathcal{R}^{k \times n} \\ \Phi \in C}} \sum_{i=1}^{n} \frac{1}{2} \|x_i - \Phi \alpha_i\|_2^2 + \lambda \|\alpha_i\|_1$$

$$C = \{\Phi \in \mathcal{R}^{m \times k} : \forall j = 1, \ldots k, \|\phi_j\|_2 < 1\}$$

wherein "Φ" is the dictionary, "x" is the observed data, and "α" is the sparse model identification vector.

2. The detector set forth in claim 1 further comprising:
   a sampler operatively disposed between the sensor and the digital signal processor, and configured to provide samples of a sensor output at a prescribed sample rate.

3. The detector set forth in claim 2 further comprising:
   a lens disposed between the pyroelectric sensor and the fixed coded aperture.

4. The detector set forth in claim 1, wherein the sensor is a pyroelectric sensor.

5. The detector set forth in claim 4, wherein the digital signal processor is configured to apply analytics for reducing false detections.

6. The detector set forth in claim 1, wherein the digital signal processor is configured to apply analytics for reducing false detections.

7. The detector set forth in claim 1 further comprising:
   a lens disposed between the pyroelectric sensor and the fixed coded aperture.

8. A security system for detecting a moving object in a predefined space comprising:
   a radiant energy sensor configured to monitor the space and measure energy radiating from the object in the space;
   a fixed coded aperture disposed between the object and the radiant energy sensor; and a digital signal processor configured to receive signals from the radiant energy sensor; and
   a digital signal processor configured to receive signals from the single sensor, wherein the detector is a single-pixel detector and the sensor is a single pixel, the digital signal processor is configured to solve a sparse inverse problem to detect the moving object using an adaptively learning dictionary represented mathematically by:

$$\min_{\substack{\alpha \in \mathcal{R}^{k \times n} \\ \Phi \in C}} \sum_{i=1}^{n} \frac{1}{2} \|x_i - \Phi \alpha_i\|_2^2 + \lambda \|\alpha_i\|_1$$

$$C = \{\Phi \in \mathcal{R}^{m \times k} : \forall j = 1, \ldots k, \|\phi_j\|_2 < 1\}$$

wherein "Φ" is the dictionary, "x" is the observed data, and "α" is the sparse model identification vector.

9. The security system set forth in claim 8 further comprising:
a sampler operatively disposed between the radiant energy sensor and the digital signal processor, and configured to provide samples of a radiant energy sensor output at a prescribed sample rate.

10. The security system set forth in claim 8, wherein the digital signal processor is configured to apply analytics for reducing false detections.

11. A method of operating a single pixel detector comprising:
sensing a moving object within a field of view of a random mask array by a single sensor;
sending a signal indicative of detection of the moving object from the sensor to a digital signal processor; and
solving a sparse inverse problem by the digital signal processor to complete detection of the moving object using an adaptively learning dictionary represented mathematically by:

$$\min_{\substack{\alpha \in \mathcal{R}^{k \times n} \\ \Phi \in C}} \sum_{i=1}^{n} \frac{1}{2} \|x_i - \Phi \alpha_i\|_2^2 + \lambda \|\alpha_i\|_1$$

$$C = \{\Phi \in \mathcal{R}^{n \times k} : \forall j = 1, \ldots k, \|\phi_j\|_2 < 1\}$$

wherein "$\Phi$" is the dictionary, "x" is the observed data, and "$\alpha$" is the sparse model identification vector, and wherein the digital signal processor is configured to receive signals from the single sensor, wherein the detector is a single-pixel detector and the sensor is a single pixel.

12. The method set forth in claim 11, wherein the single sensor is an infrared sensor.

13. The method set forth in claim 11, wherein the random mask array is a single mask.

14. The method set forth in claim 11 further comprising:
applying analytics by the digital signal processor to reduce false detections.

* * * * *